United States Patent
Sugiyama

(10) Patent No.: US 9,342,150 B2
(45) Date of Patent: May 17, 2016

(54) DISPLAY INPUT DEVICE, IMAGE FORMING APPARATUS INCLUDING THE DISPLAY INPUT DEVICE, AND METHOD OF CONTROLLING THE DISPLAY INPUT DEVICE

(71) Applicant: KYOCERA Document Solutions Inc., Osaka (JP)

(72) Inventor: Yuichi Sugiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 180 days.

(21) Appl. No.: 14/223,711

(22) Filed: Mar. 24, 2014

(65) Prior Publication Data

US 2014/0292691 A1   Oct. 2, 2014

(30) Foreign Application Priority Data

Mar. 28, 2013   (JP) ................................ 2013-069909

(51) Int. Cl.
*G06F 3/041* (2006.01)
*G06F 3/01* (2006.01)
*H04N 1/00* (2006.01)
*G06F 3/0488* (2013.01)

(52) U.S. Cl.
CPC .............. *G06F 3/016* (2013.01); *G06F 3/0488* (2013.01); *H04N 1/00411* (2013.01); *H04N 2201/0094* (2013.01)

(58) Field of Classification Search
CPC .................................................... G06F 3/016
See application file for complete search history.

(56) References Cited

U.S. PATENT DOCUMENTS

| | | | | |
|---|---|---|---|---|
| 9,041,662 B2 * | 5/2015 | Harris | .............. | G06F 3/016 178/18.04 |
| 2002/0115469 A1 | 8/2002 | Rekimoto et al. | ............ | 455/550 |
| 2002/0149561 A1 * | 10/2002 | Fukumoto | .......... | G01C 21/3664 345/156 |
| 2005/0057527 A1 * | 3/2005 | Takenaka | .............. | G06F 3/0414 345/173 |
| 2006/0097996 A1 * | 5/2006 | Tabata | ..................... | G06F 3/016 345/173 |
| 2006/0290662 A1 * | 12/2006 | Houston | ................. | A63F 13/06 345/156 |
| 2009/0160763 A1 * | 6/2009 | Cauwels | ................. | G06F 3/016 345/156 |
| 2010/0225596 A1 * | 9/2010 | Eldering | ................. | G06F 3/016 345/173 |
| 2010/0315364 A1 | 12/2010 | Miyake | ........................ | 345/173 |
| 2010/0328229 A1 * | 12/2010 | Weber | ................... | G06F 1/1626 345/173 |
| 2011/0128250 A1 * | 6/2011 | Murphy | .................. | G06F 3/016 345/174 |
| 2011/0260996 A1 * | 10/2011 | Henricson | .............. | G06F 3/016 345/173 |

(Continued)

FOREIGN PATENT DOCUMENTS

| JP | 11-212725 A | 8/1999 |
|---|---|---|
| JP | 2002-135378 A | 5/2002 |

(Continued)

*Primary Examiner* — Dorothy Harris
(74) *Attorney, Agent, or Firm* — Stein IP, LLC

(57) ABSTRACT

A display input device includes a display portion for displaying screens, a touch panel portion for detecting a touch position, a recognition portion for recognizing the touch position based on an output of the touch panel portion, a plurality of piezoelectric elements disposed not to be visually recognized from outside, to form a plurality of piezoelectric element pairs each of which includes the elements opposed to each other in a short side direction of the touch panel portion, and a drive portion for supplying a drive signal having a predetermined voltage waveform to the piezoelectric elements one or more times so as to vibrate the piezoelectric elements and the touch panel portion, and so as to start to supply the drive signal to the piezoelectric element pairs at different timings.

11 Claims, 9 Drawing Sheets

(56) References Cited

U.S. PATENT DOCUMENTS

| | | | |
|---|---|---|---|
| 2013/0050128 A1* | 2/2013 | Bae | G06F 3/041 345/173 |
| 2013/0099907 A1* | 4/2013 | Ching | G06F 3/016 340/407.1 |
| 2014/0176455 A1* | 6/2014 | Araki | G06F 3/016 345/173 |
| 2014/0225848 A1* | 8/2014 | Ogura | G06F 3/041 345/173 |
| 2014/0276069 A1* | 9/2014 | Amble | A61B 8/5207 600/447 |
| 2015/0062031 A1* | 3/2015 | Kono | G06F 3/041 345/173 |

FOREIGN PATENT DOCUMENTS

| | | |
|---|---|---|
| JP | 2005-258666 A | 9/2005 |
| JP | 2010-282346 A | 12/2010 |
| JP | 2010-286986 A | 12/2010 |

* cited by examiner

DISPLAY INPUT DEVICE, IMAGE FORMING APPARATUS INCLUDING THE DISPLAY INPUT DEVICE, AND METHOD OF CONTROLLING THE DISPLAY INPUT DEVICE

CROSS-REFERENCE TO RELATED APPLICATIONS

This application is based upon and claims the benefit of priority from the corresponding Japanese Patent Application No. 2013-069909 filed Mar. 28, 2013, the entire contents of which are hereby incorporated by reference.

BACKGROUND OF THE INVENTION

The present disclosure relates to a display input device including a display portion and a touch panel portion, a method of controlling the display input device, and an image forming apparatus including the display input device.

In recent years, equipment such as a multifunction peripheral, a copier, or a printer is equipped with an operation panel including a display portion and a touch panel portion. Using the touch panel portion, a touch position corresponding to a key or a button displayed on the display portion is recognized. A touch operation is accepted as an input of selecting a key or a button of a position corresponding to the touch position. When the input is accepted, a display on the display portion is changed (for example, the color of the button is changed). However, there is a case where the visual change is hard to recognize (particularly for a user having visual impairment). Therefore, in order to recognize that the touch is done (that the input of pressing the button is accepted) by the sense of touch, the touch panel portion may be vibrated.

There is known the following technique of vibrating the touch panel portion. Specifically, there is known an information display device including an information display surface, a transparent or translucent operation portion with a predetermined operation surface disposed on the information display surface, bidirectional functional means combined to the operation portion to be capable of converting between a mechanical action and an electric signal in a bidirectional manner, operation signal fetching means for fetching an electric signal generated from the bidirectional functional means by an operation force given to the operation surface as an operation signal, and drive control means configured to respond to the operation signal so as to send out an electric drive signal to the bidirectional functional means. By the drive signal, a mechanical reaction (vibration) generated in the bidirectional functional means is transmitted to the operation surface. With this structure, the operation surface is vibrated so that the user is provided with secure operation feeling.

As described above, by vibrating the touch panel portion, it is possible to recognize that the operation is accepted by the sense of touch.

In a cellular phone or the like, in order to vibrate the touch panel portion or a case, a vibration motor (for example, a motor with an eccentric weight attached to a rotor) may be conventionally used. However, in the case where the vibration motor is used, the vibration lasts for a relatively long period so that the operation feeling is deteriorated.

Therefore, a piezoelectric element may be used for vibrating (deforming) the touch panel portion. Utilizing characteristics of the piezoelectric element that deforms when a voltage is supplied, a voltage is supplied to the piezoelectric element as a pulse (as an impulse), for example, so as to vibrate the touch panel portion instantaneously (the vibration period of the touch panel portion is set to be shorter than in the case where the vibration motor is used). In this way, the user can be provided with operation feeling (click feeling) like that when a button or a key is pressed.

However, the display portion and the touch panel portion of the operation panel of the image forming apparatus such as the multifunction peripheral are much larger than those of the cellular phone. Therefore, in order to vibrate the touch panel portion of the image forming apparatus by the piezoelectric element, it is necessary to dispose a plurality of piezoelectric elements so that the user can be provided with operation feeling (click feeling) like that when a button or a key is pressed (so that the touch panel portion is sufficiently vibrated). For instance, the plurality of piezoelectric elements may be disposed along a long side direction of the touch panel portion or the display portion.

Here, when all the piezoelectric elements are simultaneously vibrated (when the piezoelectric elements are simultaneously deformed), vibrations of the piezoelectric elements may interfere with each other (cancel each other), and hence there may be generated a part with no vibration or a part with attenuated vibration in the touch panel portion. For instance, in a part sandwiched between the piezoelectric elements or in a part close to the piezoelectric element, vibration amount (deformation amount of the touch panel portion) is reduced. In this way, when a plurality of piezoelectric elements are used for vibrating the touch panel portion, there is a problem that the touch panel portion cannot be vibrated so as to provide the user with operation feeling (click feeling) like that when a button or a key is pressed.

Here, the technique described above is not a technique related to solution of the problem that the touch panel portion cannot be vibrated so as to provide click feeling when all the piezoelectric elements are simultaneously vibrated. Therefore, the technique described above cannot solve the above-mentioned problem.

SUMMARY OF THE INVENTION

An image forming apparatus according to a first aspect of the present disclosure includes a display portion, a touch panel portion, a recognition portion, a plurality of piezoelectric elements, and a drive portion. The display portion displays screens for operation and setting. The touch panel portion is disposed on a top surface of the display portion so as to detect a touched position. The recognition portion recognizes the touched position on the touch panel portion based on an output of the touch panel portion. The plurality of piezoelectric elements are disposed adjacent to a region that is not visually recognized from outside in the touch panel portion, and are disposed along a long side direction of the touch panel portion so as to be opposed to each other in a short side direction of the touch panel portion. There are formed a plurality of piezoelectric elements pairs, each of which includes a pair of piezoelectric elements opposed to each other in the short side direction of the touch panel portion. The drive portion supplies a drive signal having a predetermined voltage waveform to the piezoelectric elements one or more times so as to vibrate the piezoelectric elements and the touch panel portion, and does not simultaneously start to apply the drive signal to all the piezoelectric element pairs.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is an exploded perspective view illustrating a structure of a display portion, a touch panel portion, and the like.

DETAILED DESCRIPTION OF THE EMBODIMENTS

Now, an embodiment of the present disclosure is described with reference to FIGS. 1 to 10. In the following description, a multifunction peripheral 100 (corresponding to the image forming apparatus) including an operation panel 1 (corresponding to the display input device) is exemplified. Further, the embodiment is described with reference to FIGS. 1 to 8. In addition, a variation is described with reference to FIGS. 9 and 10. However, elements such as a structure and a layout described in the embodiment are merely examples and should not be interpreted to limit the scope of the disclosure.

(General Outline of Image Forming Apparatus)

Figure 1:
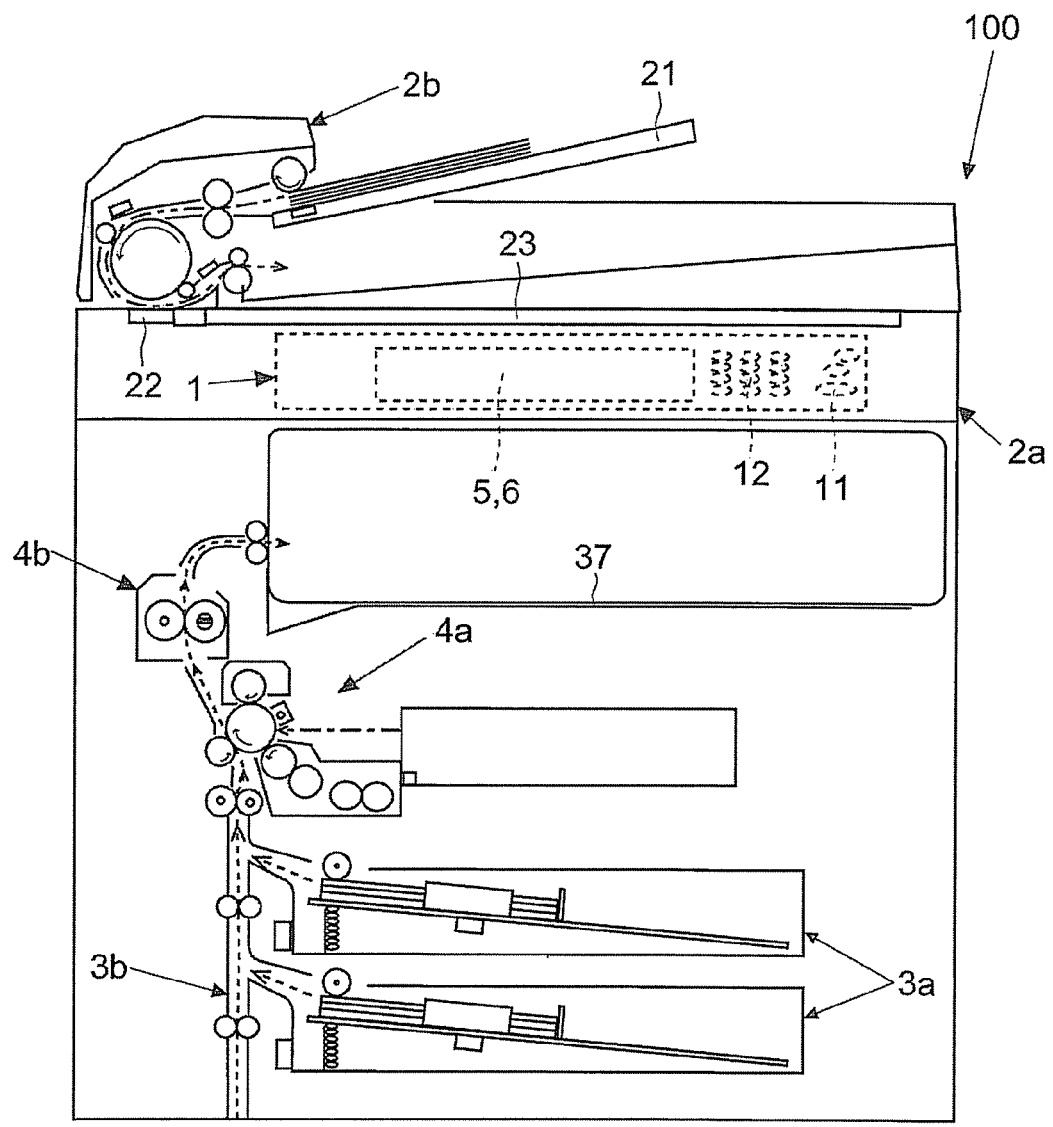
FIG. 1 is a schematic front cross-sectional view illustrating an example of a multifunction peripheral.

Next, with reference to FIG. 1, general outline of the multifunction peripheral 100 according to the embodiment is described. FIG. 1 is a schematic front cross-sectional view illustrating an example of the multifunction peripheral 100.

First, as illustrated in FIG. 1, on a front face of the multifunction peripheral 100, there is disposed the operation panel 1 as illustrated by a broken line, for performing various settings and inputs of the multifunction peripheral 100 (details are described later). Further, an image reader 2a and a document feeder 2b are disposed at the upper part. In addition, the multifunction peripheral 100 includes a paper sheet feeder 3a, a transport portion 3b, an image forming portion 4a, and a fixing portion 4b, which are disposed in a main body.

The document feeder 2b feeds document sheets one by one from a document tray 21 in an automatic and continuous manner to a reading position (contact glass 22 for feed reading). In addition, the document feeder 2b is attached to the image reader 2a in an openable and closable manner upward and downward with a pivot axis at rear side of the paper plane of FIG. 1, so as to work as a cover for pressing the contact glass (the contact glass 22 for feed reading and a contact glass 23 for place reading) of the image reader 2a from above.

The image reader 2a reads a document sheet passing through the contact glass 22 for feed reading or a document sheet placed on the contact glass 23 for place reading, so as to obtain image data of the document sheet. Note that the image reader 2a of this embodiment can read both a color document and a black and white document. The multifunction peripheral 100 can print based on the image data obtained by reading (as a copy function).

The paper sheet feeder 3a stores a plurality of paper sheets and feeds the sheets one by one to the transport portion 3b. The transport portion 3b is a path for transporting the paper sheet fed from the paper sheet feeder 3a. Note that the image forming portion 4a, the fixing portion 4b, and the like are disposed in the paper sheet transport path.

The image forming portion 4a forms a toner image based on image data and transfers the toner image onto the transported paper sheet. The fixing portion 4b fixes the toner image transferred onto the paper sheet. The paper sheet with the fixed toner image is discharged to a discharge tray 37. In this way, image formation (printing) is performed when a copy function or a printer function is used.

(Operation Panel 1)

Figure 2:
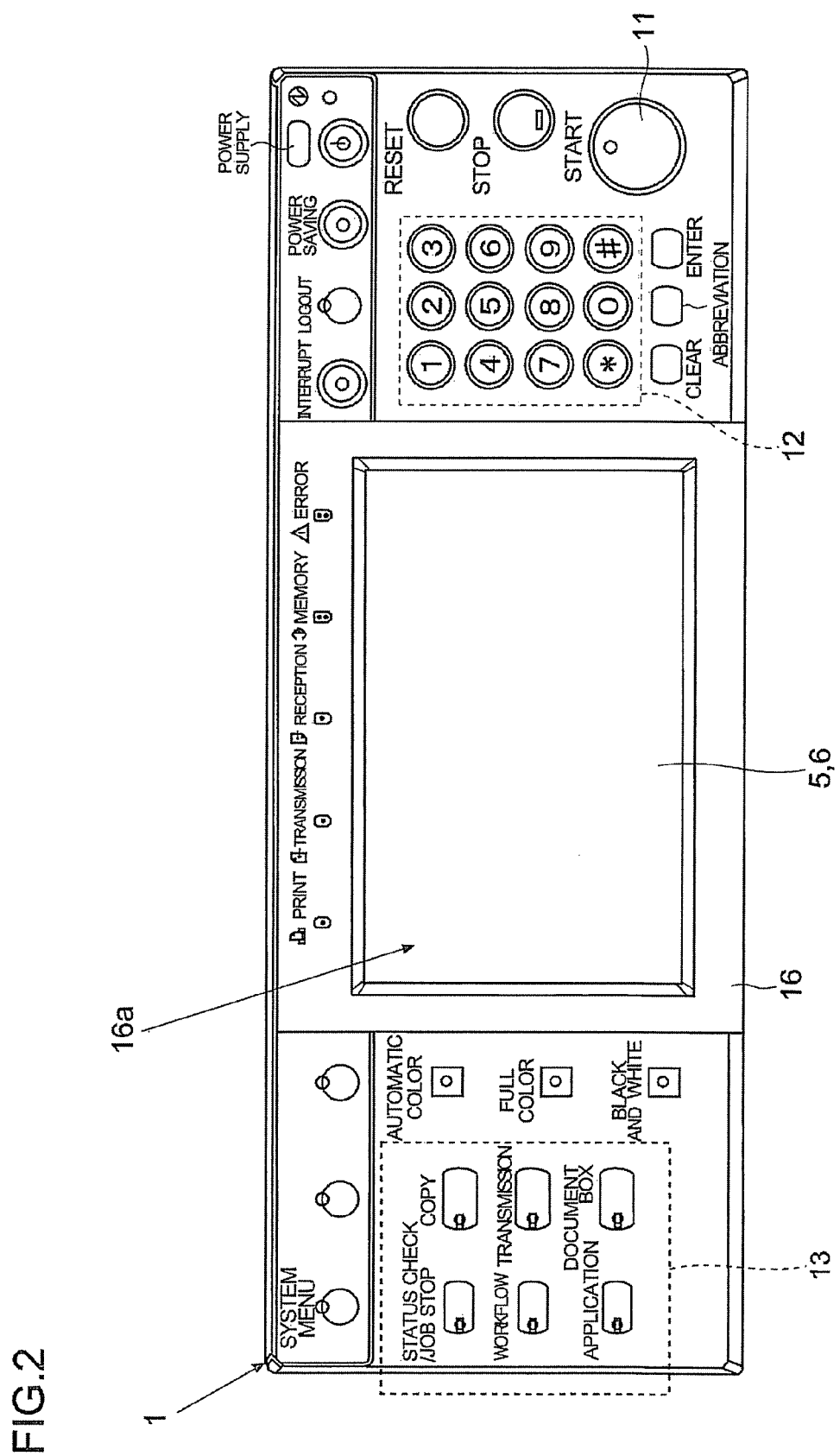
FIG. 2 is a plan view illustrating an example of an operation panel.

Next, with reference to FIG. 2, an example of the operation panel 1 according to the embodiment is described. FIG. 2 is a plan view illustrating an example of the operation panel 1.

As illustrated in FIG. 1, the operation panel 1 is disposed on the upper part of the front face of the multifunction peripheral 100. The operation panel 1 includes a display portion 5 for displaying menus and keys for settings and operation instructions of the multifunction peripheral 100, and various images and screens for status messages and setting of the multifunction peripheral 100. For instance, the display portion 5 is a liquid crystal display panel, an organic EL display panel, or the like.

Further, on the top surface of the display portion 5, there is disposed a touch panel portion 6 for detecting a touched position. The touch panel portion 6 detects a position (coordinates) of a part touched by a user on the display portion 5. Note that various types such as a resistor film type, a surface acoustic wave type, an infrared type, and a capacitive type can be used as the touch panel portion 6 without limiting to a particular type.

Detected coordinates using the touch panel portion 6 are compared with positions or coordinates of various keys displayed on the display portion 5, so as to recognize a key intended to touch and press on the touch panel portion 6 (a key just below the touch position) among keys displayed on the display portion 5. Then, the key pressed and selected by the user is specified, and the input is accepted. Thus, various settings and operation instructions in various functions such as copying and transmission of the multifunction peripheral 100 can be performed.

In addition, on the operation panel 1, there are disposed hardware keys such as a start key 11 for instructing to start a job such as copying after various setting, a ten-key portion 12 for numerical input, and a function selection key group 13 for selecting a function to be used. In this way, the operation panel 1 is equipped with the touch panel portion 6 and the various hardware keys. The touch panel portion 6 and the various hardware keys work as portions for performing various settings and mode selections, and the like in each function of the multifunction peripheral 100.

(Hardware Structure of Multifunction Peripheral 100 and the Like)

Figure 3:
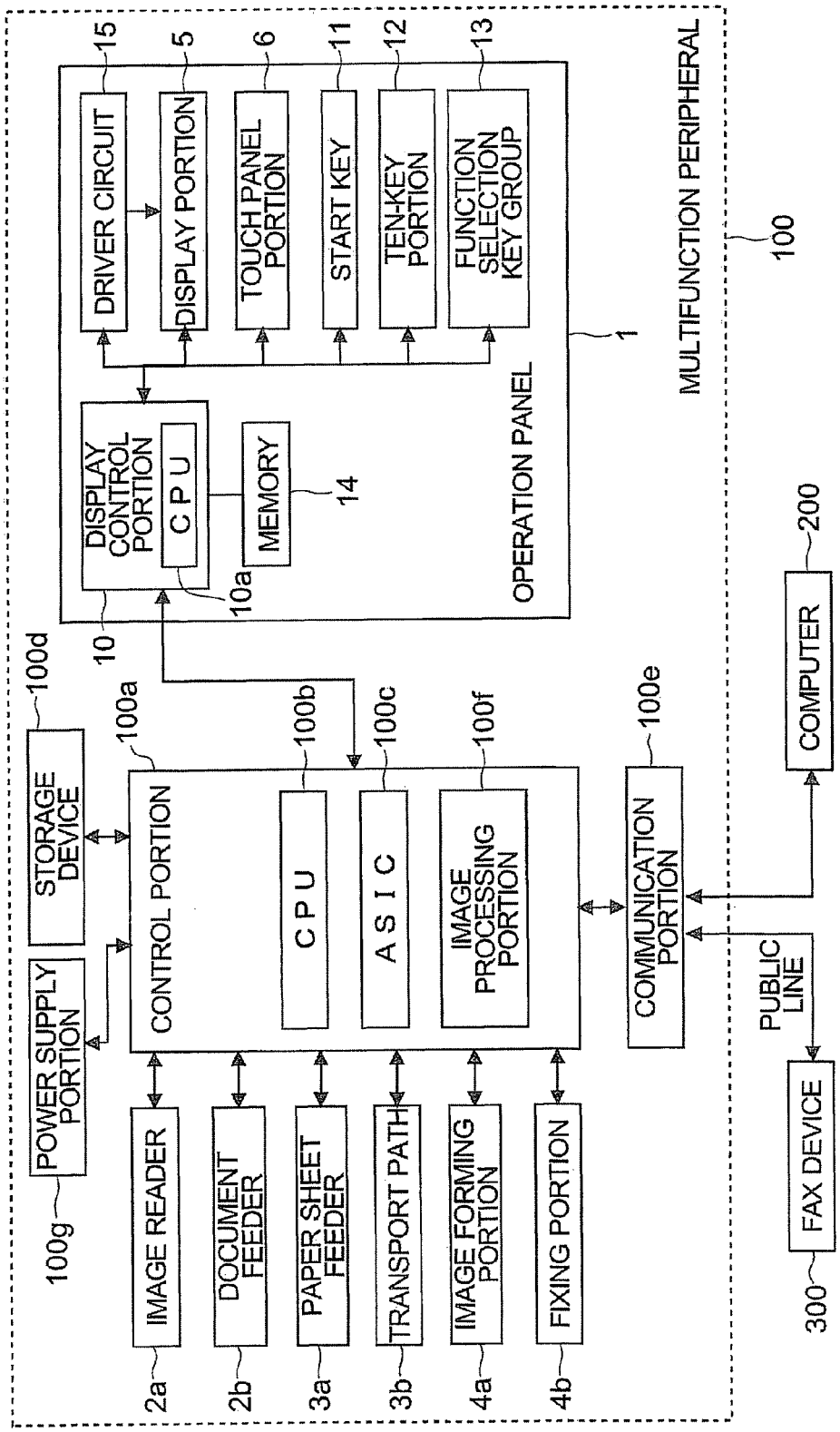
FIG. 3 is a block diagram illustrating an example of a hardware structure of the multifunction peripheral.

Next, with reference to FIG. 3, an example of a hardware structure of the multifunction peripheral 100 according to the embodiment is described. FIG. 3 is a block diagram of an example of the hardware structure of the multifunction peripheral 100.

First, in a main body of the multifunction peripheral 100, there is disposed a control portion 100a. The control portion 100a is connected, for example, to the operation panel 1, the image reader 2a, the document feeder 2b, the paper sheet feeder 3a, the transport portion 3b, the image forming portion 4a, the fixing portion 4b, and the like, and controls them.

The control portion 100a includes elements such as a CPU 100b and an ASIC 100c that is a dedicated circuit. CPU 100b and ASIC 100c perform a process in the multifunction peripheral 100. The CPU 100b performs operations and the like based on a control program that is stored in a storage device 100d and is loaded, so as to control individual portions of the multifunction peripheral 100. Note that it is possible to dispose a plurality of the control portions for respectively performing controls of functions such as general control, main control for image processing, engine control for image formation and turning on and off motors and the like for rotating various rollers so as to control printing, and the like. In this description, there is described the case where these control portions are integrated as the single control portion 100a.

The storage device 100d is connected to the control portion 100a. The storage device 100d is constituted by combining a ROM, a RAM, an HDD, and the like. The storage device 100d can store programs for controlling the multifunction peripheral 100, and various data including data for control, set data, image data of the document sheets read by the image reader 2a, and the like.

Further, the control portion 100a is connected to a communication portion 100e including various connectors, sockets, a FAX modem, and the like. The communication portion 100e is connected to a plurality of external computers 200 (for example, personal computers or servers), and FAX devices 300 on the other end (only each one of them is illustrated in FIG. 3 for convenience sake), via a network, a public line, and the like. For instance, the image data obtained by the image reader 2a can be stored in the storage device 100d or can be transmitted to the external computer 200 or to the FAX device 300 on the other end (scanner function and FAX function). In addition, it is possible to perform printing based on image data transmitted from the external computer 200 or the FAX device 300 on the other end or image data input to the multifunction peripheral 100 (printer function and FAX function).

In addition, the control portion 100a recognizes an input to the operation panel 1 and controls the multifunction peripheral 100 so that copy or the like is performed in accordance with setting performed by the user. For instance, the paper sheet feeder 3a to be used is specified and copy job is set by the operation panel 1, the control portion 100a controls the specified paper sheet feeder 3a to feed a paper sheet. In addition, the control portion 100a controls the communication portion 100e to transmit the image data to a transmission destination specified by the operation panel 1.

In addition, for example, the control portion 100a includes an image processing portion 100f configured to perform image processing on the image data obtained by reading the document sheet by the image reader 2a and the image data input to the multifunction peripheral 100 via the communication portion 100e. The image data processed by the image processing portion 100f is used for forming the toner image, for example, or is transmitted to the communication portion 100e and is sent out externally.

The operation panel 1 of this embodiment includes a display control portion 10 (corresponding to the recognition portion), a memory 14 (corresponding to a storage portion), a driver circuit 15, the display portion 5, and the touch panel portion 6. The display control portion 10 includes a circuit such as a CPU 10a and an IC. The display control portion 10 controls a display on the display portion 5 and receives an output of the touch panel portion 6 so as to specify coordinates of a position pressed on the display portion 5. Data such as a table indicating correspondence between the output of the touch panel portion 6 and the coordinates are stored in the memory 14. The display control portion 10 compares coordinates of the pressed position with image data of each setting screen so as to recognize the touched position on the touch panel portion 6, and hence specifies and recognizes a selected (pressed) key on the setting screen.

Specifically, in order to select a set item of each function and to set a set value of the multifunction peripheral 100, it is repeated to touch the touch panel portion 6 so as to select a key displayed on the display portion 5 from a top layer display on the display portion 5. Further, for each selection of key, the display control portion 10 changes the display on the display portion 5. Further, the user finally sets a set value of the function to be selected and set. The display control portion 10 recognizes that this function is selected and that the setting is performed, and transmits contents thereof to the control portion 100a of the main body. Thus, the control portion 100a controls the individual portions such as the image forming portion 4a to perform operations on which the function selected and set by the operation panel 1 is reflected. Then, the user's intension is reflected on the printing, transmission, and the like (for example, density setting, enlargement or reduction, and the like).

Further, image data of screens and images displayed on the display portion 5 are stored in the memory 14 in the operation panel 1. Therefore, the display control portion 10 reads out image data of the screen to be displayed next from the memory 14 every time when a key in a selection screen of a set item or each setting screen is operated. Note that image data of screens and images to be displayed on the display portion 5 may be stored in the storage device 100d of the main body side. In this case, the operation panel 1 receives the image data for performing the display on the display portion 5 from the storage device 100d via the control portion 100a.

The display control portion 10 instructs the driver circuit 15 that actually controls a display on the liquid crystal screen. Note that it is possible that a structure (CPU 100b or the storage device 100d) of the control portion 100a performs the functions of the display control portion 10 and the memory 14 without disposing the display control portion 10 and the memory 14 in the operation panel 1.

(Display Portion 5 and Touch Panel Portion 6)

Figure 4:
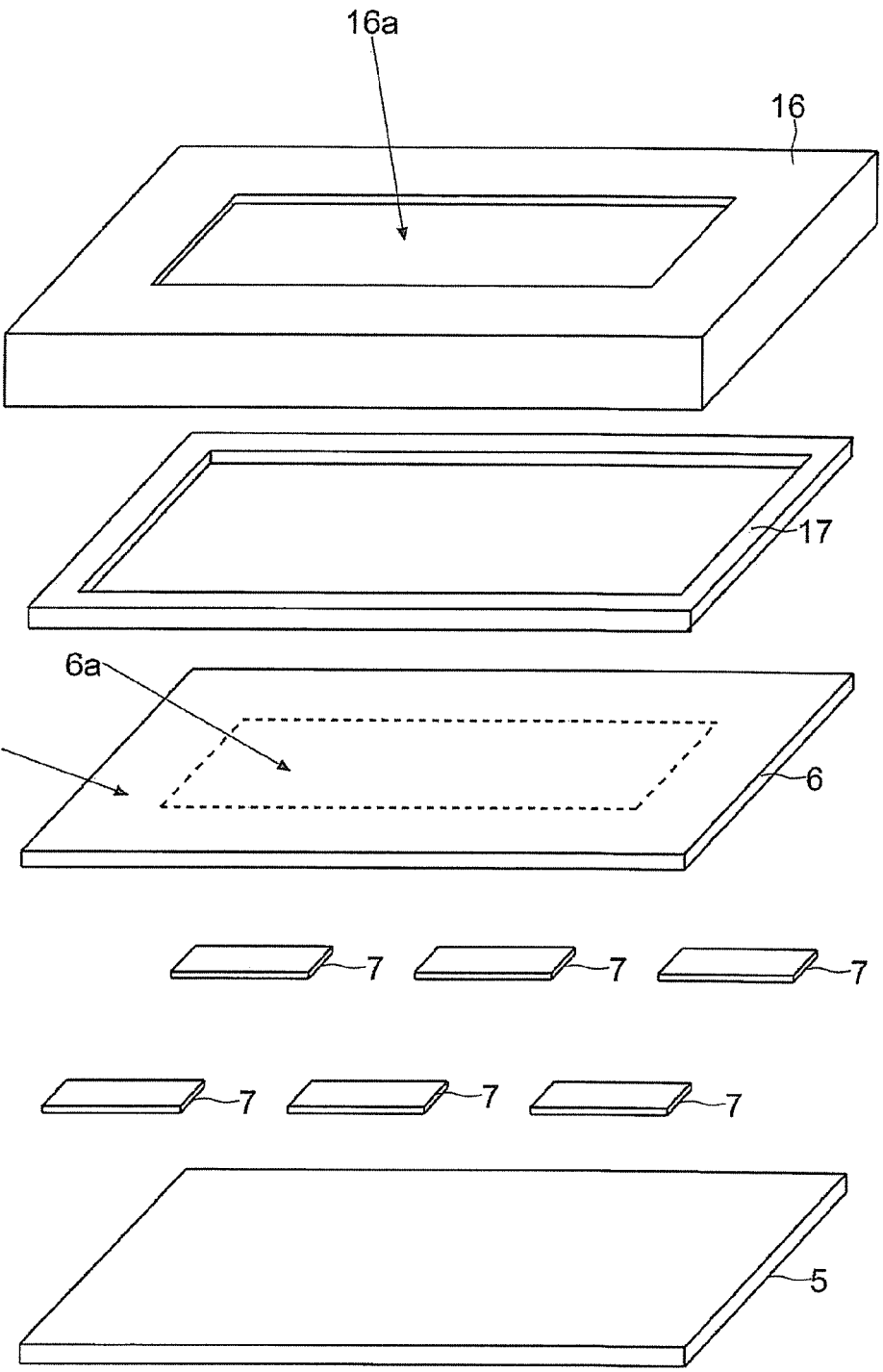

Next, with reference to FIG. 4, a display on the operation panel 1 and a part to be touched for input are described. FIG. 4 is an exploded perspective view illustrating a structure of the display portion 5, the touch panel portion 6, and the like.

As illustrated in FIG. 4, the operation panel 1 includes the touch panel portion 6 and a plurality of rectangular (band-like) piezoelectric elements 7. The plurality of piezoelectric elements 7 are attached to contact with the touch panel portion 6 (on a back side of the touch panel portion 6). Each piezoelectric element 7 is made of a material having a piezoelectric effect such as lead zirconate titanate. In addition, a lamination type can be used for each piezoelectric element 7.

In addition, the display portion 5 is disposed on the back side of the touch panel portion 6 at a predetermined space with the touch panel portion 6. The touch panel portion 6 transmits the screen and the image displayed on the display portion 5. For instance, a transparent plastic plate or glass plate is used for the touch panel portion 6. In addition, the piezoelectric elements 7 are attached to the surface of the lower side (display portion 5 side) of the touch panel portion 6. For instance, the piezoelectric elements 7 are attached to the touch panel portion 6 with adhesive or double sided adhesive tape.

Further, a case 16 is disposed to cover the touch panel portion 6, the piezoelectric element 7, and the display portion 5. A seal member 17 is sandwiched between the case 16 and the touch panel portion 6 for preventing dust and waste from entering. The seal member 17 has a rectangular loop shape and a size along a peripheral upper surface of the touch panel portion 6 so as to contact with the inner surface of the case 16. Further, it is preferred that the touch panel portion 6 of this embodiment be made of low repulsion material because it is vibrated (deformed) by the piezoelectric elements 7.

In addition, a part of the case 16 is provided with an opening 16a (operation window). The opening 16a has a rectangular shape. A part of the touch panel portion 6 is exposed externally in the rectangular region corresponding to the opening 16a. This exposed part can be visually recognized by the user (from the outside) to be a region that the user can touch (touchable region 6a). The user touches a display position of a key or the like on the display portion 5 through the touchable region 6a, and hence can set a desired function and set item. On the other hand, the piezoelectric elements 7 are attached to a region of the touch panel portion 6 that is hidden by the case 16 so as not to be visually recognized and cannot be touched by the user (outer peripheral region 6b).

(Layout of Piezoelectric Elements 7)

Figure 5:
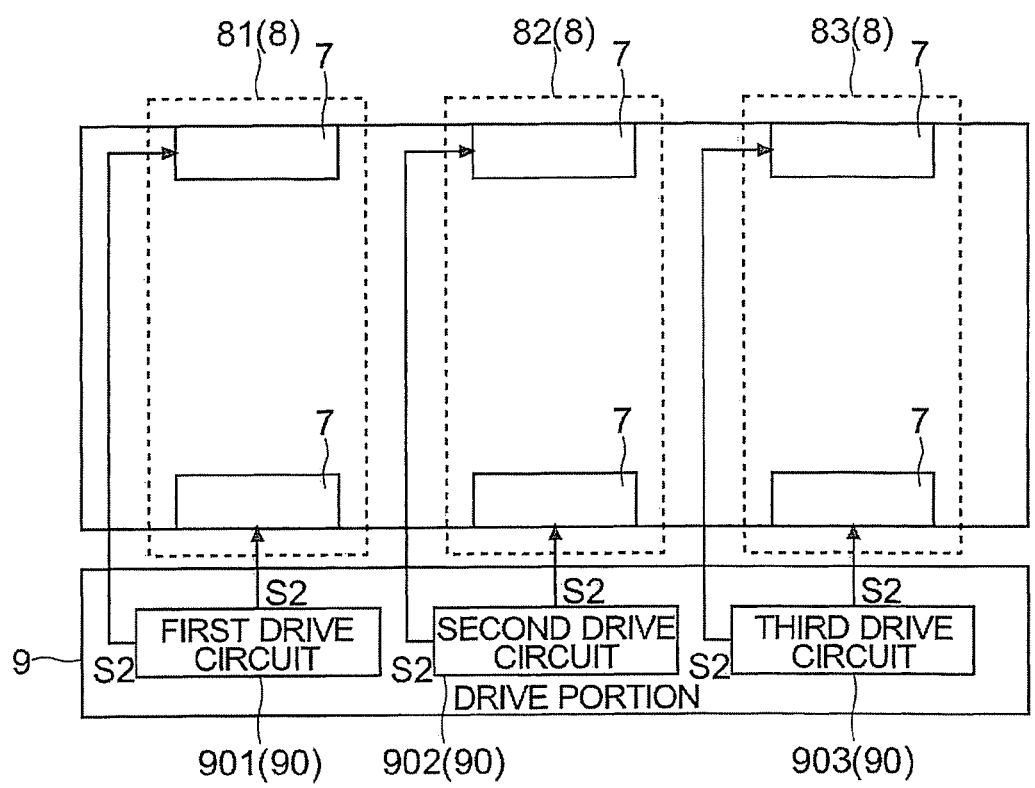
FIG. 5 is an explanatory diagram illustrating an example of arrangement of the piezoelectric elements in the touch panel portion.

Next, with reference to FIG. 5, an example of a layout of the piezoelectric elements 7 in the operation panel 1 according to the embodiment is described. FIG. 5 is an explanatory diagram illustrating an example of a layout of the piezoelectric elements 7 with respect to the touch panel portion 6.

First, as illustrated in FIG. 5, the operation panel 1 of this embodiment is equipped with the six piezoelectric elements 7. A plurality of the piezoelectric elements 7 are disposed along the long side direction of the touch panel portion 6. Specifically, three piezoelectric elements 7 are disposed along each of the long sides of the touch panel portion 6.

Further, the piezoelectric elements 7 are disposed to be opposed to each other in the short side direction of the touch panel portion 6. Further, a pair of piezoelectric elements 7 opposed to each other in the short side direction of the touch panel portion 6 form a piezoelectric element pair 8 (three pairs are disposed in this embodiment). Note that when four piezoelectric elements 7 are disposed along the each long side direction of the touch panel portion 6, there are four piezoelectric element pairs 8 (it is possible to dispose four or more piezoelectric element pairs 8).

Here, in the following description, a piezoelectric element pair 8 at the left end of the touch panel portion 6 is referred to as a "first piezoelectric element pair 81". In addition, a piezoelectric element pair 8 at the middle of the touch panel portion 6 is referred to as a "second piezoelectric element pair 82". In addition, a piezoelectric element pair 8 at the right end of the touch panel portion 6 is referred to as a "third piezoelectric element pair 83".

A drive portion 9 is disposed in the operation panel 1. The drive portion 9 supplies a drive signal S2 having a predetermined voltage waveform to the piezoelectric elements 7 and vibrates the piezoelectric elements 7, so as to vibrate the touch panel portion 6 contacting with the piezoelectric elements 7. The drive portion 9 includes a plurality of drive circuits 90 (drive ICs), and one drive circuit 90 is disposed for each of the piezoelectric element pairs 8.

Specifically, a first drive circuit 901 is disposed for the first piezoelectric element pair 81. The first drive circuit 901 supplies the drive signal S2 to the piezoelectric elements 7 included in the first piezoelectric element pair 81 simultaneously (or not simultaneously). In addition, a second drive circuit 902 is disposed for the second piezoelectric element pair 82. The second drive circuit 902 supplies the drive signal S2 to the piezoelectric elements 7 included in the second piezoelectric element pair 82 simultaneously (or not simultaneously). In addition, a third drive circuit 903 is disposed for the third piezoelectric element pair 83. The third drive circuit 903 supplies the drive signal S2 to the piezoelectric elements 7 included in the third piezoelectric element pair 83 simultaneously (or not simultaneously).

(Structure for Vibrating Touch Panel Portion 6)

Figure 6:
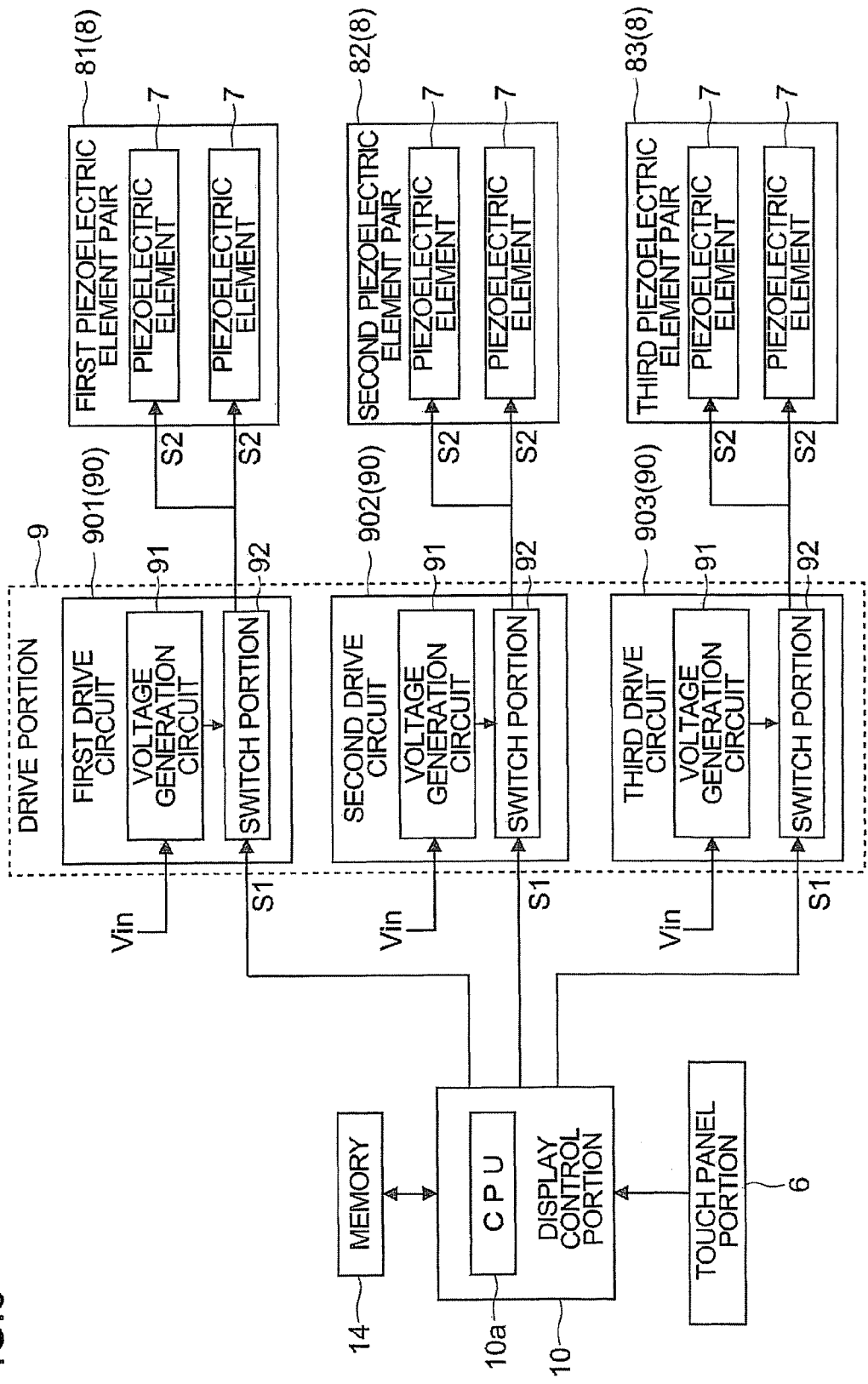
FIG. 6 is a block diagram illustrating an example of a structure for vibrating the touch panel portion in the operation panel according to the embodiment.

Next, with reference to FIG. 6, an example of a structure for vibrating the touch panel portion 6 of the operation panel 1 according to the embodiment is described. FIG. 6 is a block diagram illustrating an example of a structure for vibrating the touch panel portion 6 of the operation panel 1 according to the embodiment.

In the operation panel 1 of this embodiment, the display control portion 10 recognizes that the touch panel portion 6 is touched based on the output of the touch panel portion 6. Then, when recognizing the touch input to the touch panel portion 6 (when recognizing an operation to a displayed key), the display control portion 10 supplies the drive signal S2 to the plurality of piezoelectric element pairs 8, so that the touch panel portion 6 is vibrated (deformed). This vibration of the touch panel portion 6 can provide the user with operation feeling (click feeling) like that when a button or a key is pressed.

Therefore, with reference to FIG. 6, a structure for vibrating the touch panel portion 6 is described. Each of the first drive circuit 901, the second drive circuit 902, and the third drive circuit 903 is provided with a voltage generation circuit 91 and a switch portion 92. Because the individual drive circuits 90 have the same structure, the voltage generation circuits 91 and the switch portions 92 included in the drive circuits 90 are denoted by the same numerals, for convenience sake.

Each voltage generation circuit 91 generates a voltage to be supplied to each piezoelectric element 7. Each voltage generation circuit 91 is supplied with a voltage Vin from a power supply portion 100g (see FIG. 3) that is connected to a commercial power source and generates a voltage necessary for the multifunction peripheral. Then, the voltage generation circuit 91 steps up the voltage Vin and generates a voltage for applying an electric field so as to deform the piezoelectric element 7.

In this embodiment, each piezoelectric element 7 is supplied with a voltage having a pulse waveform one or more times as the drive signal S2 (having an amplitude of a few tens volts, for example). In other words, when the touch panel portion 6 is vibrated, the drive circuits 90 (the first drive circuit 901, the second drive circuit 902, and the third drive circuit 903) supplies one or more pulses to the piezoelectric elements 7. Alternatively, it is possible to supply one or more periods of sine wave voltage signal to the piezoelectric elements 7 as the drive signal S2. In this way, each drive circuit 90 applies (supplies) the voltage whose amplitude varies as the drive signal S2 to each piezoelectric element 7. For instance, the voltage generation circuit 91 generates the drive signal S2 having a frequency that can vibrate each piezoelectric element 7 most.

Specifically, when vibrating the touch panel portion 6, the display control portion 10 (CPU 10a) gives an instruction signal S1 for vibrating the piezoelectric element 7 to the switch portion 92 of the drive circuit 90 corresponding to the piezoelectric element pair 8 to be vibrated. The switch portion 92 that receives the instruction signal S1 becomes ON state, and the switch portion 92 supplies the voltage generated by the voltage generation circuit 91 (drive signal S2) to the piezoelectric element 7. Then, after a predetermined number of (one or more) pulses or periods of sine wave (drive signal S2) are supplied, the switch portion 92 becomes OFF state.

Note that the display control portion 10 can recognize a period in which the touch is continued based on the output of the touch panel portion 6. Therefore, the display control portion 10 may give the instruction signal S1 to the switch portions 92 of the drive portions 9, which instructs to increase the number of times of the drive signal S2 to be supplied to the piezoelectric element pairs 8 (the first piezoelectric element pair 81, the second piezoelectric element pair 82, and the third piezoelectric element pair 83) or instructs to increase the amplitude of the voltage as the drive signal S2 more, as the touch period is longer. When receiving this instruction signal S1, the drive circuits 90 increases the number of times of the drive signal S2 to be supplied to the piezoelectric element pair 8 (for example, increases the number of pulses or periods of the sine wave to be input), or increases the amplitude of the voltage as the drive signal S2, as the touch period is longer.

(Vibration Control of the Touch Panel Portion 6)

Figure 7:
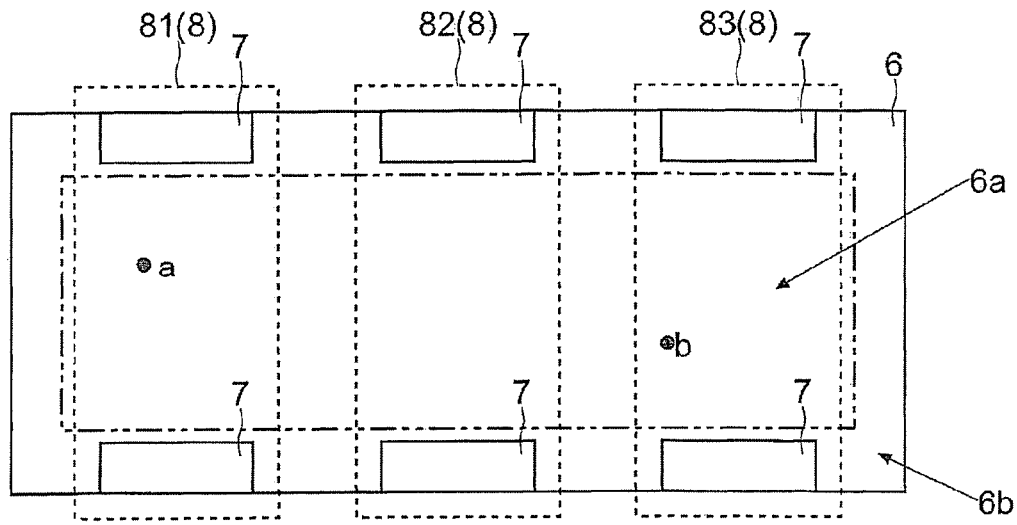
FIG. 7 is an explanatory diagram for explaining a piezoelectric element pair to be vibrated in accordance with a touch position in the operation panel according to the embodiment.
Figure 8:
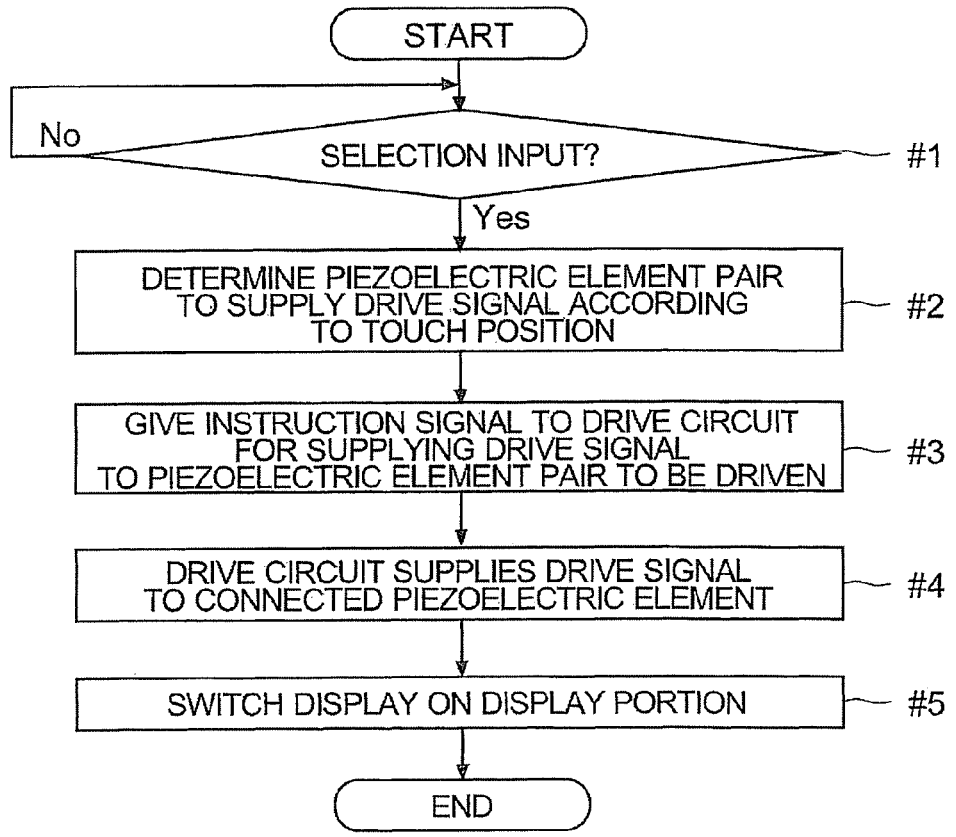
FIG. 8 is a flowchart illustrating an example of a vibration control flow of the touch panel portion in the operation panel according to the embodiment.

Next, with reference to FIGS. 7 and 8, an example of the vibration control of the touch panel portion 6 of the operation panel 1 according to the embodiment is described. FIG. 7 is an explanatory diagram for explaining the piezoelectric element pair 8 to be vibrated in accordance with a touch position on the operation panel 1 according to the embodiment. FIG. 8 is a flowchart illustrating an example of the vibration control flow of the touch panel portion 6 of the operation panel 1 according to the embodiment.

First, in the operation panel 1 of this embodiment, three piezoelectric element pairs 8 (total six piezoelectric elements 7) are disposed. Then, the first piezoelectric element pair 81, the second piezoelectric element pair 82, and the third piezoelectric element pair 83 are supplied with the drive signal S2 at the same timing so as to vibrate (contract) the piezoelectric elements 7 at the same timing. Then, an interference between vibrations occurs, and a part of the touch panel portion 6 where the vibration is weak (a curved amount or a deformed amount in the up and down direction is small) may be generated. It is known that in the case where the piezoelectric elements 7 are arranged like this embodiment, when the drive signal S2 is supplied to all the piezoelectric element pairs 8 at the same time, the vibration (deformation) of the touch panel portion 6 is apt to be weak in the middle portion in the left and right direction (long side direction) of the touch panel portion 6 (in a region sandwiched between the first piezoelectric element pair 81 and the third piezoelectric element pair 83) in the touch panel portion 6.

Therefore, in the operation panel 1 of this embodiment, when the touch panel portion 6 is touched (when accepting an operation such as a selection input of a set item or a set value by touching a display position of a key or the like), the drive portion 9 supplies the drive signal S2 to the two piezoelectric element pairs 8 close to the touch position recognized by the display control portion 10, so as to vibrate only the two piezoelectric element pairs 8 close to the touch position.

Specifically, the description is made with reference to FIG. 7. First, a double-dot dashed line in FIG. 7 indicates an example of the touchable region 6a. For instance, when a point illustrated in FIG. 7 is touched in the touchable region 6a, the display control portion 10 gives the instruction signal S1 to the first drive circuit 901 and the second drive circuit 902 in the drive portion 9. As a result, the drive portion 9 (the first drive circuit 901 and the second drive circuit 902) supplies the drive signal S2 to the first piezoelectric element pair 81 and the second piezoelectric element pair 82 so as to vibrate the four piezoelectric elements 7.

In addition, when a point b illustrated in FIG. 7 is touched in the touchable region 6a, the display control portion 10 gives the instruction signal S1 to the second drive circuit 902 and the third drive circuit 903 in the drive portion 9. As a result, the drive portion 9 (the second drive circuit 902 and the third drive circuit 903) supplies the drive signal S2 to the second piezoelectric element pair 82 and the third piezoelectric element pair 83 so as to vibrate the four piezoelectric elements 7.

In this way, in this embodiment, when an input of a key selection is accepted by touching in the left half region of the touchable region 6a of the touch panel portion 6, the drive portion 9 supplies the drive signal S2 to the piezoelectric elements 7 of the first piezoelectric element pair 81 and the second piezoelectric element pair 82 so as to vibrate the piezoelectric elements 7. In addition, when the input of a key selection is accepted by touching in the right half region of the touchable region 6a of the touch panel portion 6, the drive portion 9 supplies the drive signal S2 the piezoelectric elements 7 of the second piezoelectric element pair 82 and the third piezoelectric element pair 83 so as to vibrate the piezoelectric elements 7.

Next, with reference to FIG. 8, an example of the vibration control flow of the touch panel portion 6 of the operation panel 1 according to the embodiment is described.

First, the flow of FIG. 8 starts not in a state where the operation of the touch panel portion 6 is stopped in a power save mode or the like but in a state where the operation panel 1 waits for the user to input.

Then, the display control portion 10 checks whether or not the display position in the input region such as a key or a button for setting input is touched, based on the output of the touch panel portion 6 (Step #1). In other words, the display control portion 10 checks whether or not the touched position is a position at which the key or the like is displayed (whether or not an operation input of selecting the key or the like is accepted), based on the output of the touch panel portion 6. Note that it is possible to vibrate the piezoelectric element pairs 8 also when other region than the input region of a key or the like (for example, a space region) is touched.

When there is no selection input of a key or the like (No in Step #1), the flow returns to Step #1. On the other hand, when there is a selection input of a key or the like (Yes in Step #1), the display control portion 10 determines the piezoelectric element pair 8 to be supplied with the drive signal S2 based on the touch position (Step #2).

In the case where eight or more piezoelectric element pairs 8 are disposed or other case, calculation for determining the piezoelectric element pair 8 to be driven based on the touch position may be complicated. Therefore, the memory 14 may store set data indicating the piezoelectric element pair 8 to be supplied with the drive signal S2 in accordance with the recognized touch position. Then, the display control portion 10 may refer to the set data in accordance with the touch position so as to determine the piezoelectric element pair 8 to be driven. Thus, the drive portion 9 supplies the drive signal S2 to the piezoelectric element pair 8 in accordance with the recognized touch position and the set data.

Then, the display control portion 10 gives the instruction signal S1 to the drive circuit 90 (switch portion 92) that supplies the drive signal S2 to the two piezoelectric element pairs 8 out of the three piezoelectric element pairs 8 in accordance with the touch position (Step #3). The drive circuit 90 that receives the instruction signal S1 supplies the drive signal S2 to the connected piezoelectric elements 7 (Step #4). Thus, only a part of the disposed piezoelectric element pairs 8 are vibrated (in this embodiment, two out of three). Note that it is possible to change the number of times or the amplitude of the drive signal S2 to be supplied to the piezoelectric elements 7 in accordance with the touch period of the touch panel portion 6.

Note that the display control portion 10 may give the instruction signal S1 simultaneously to the drive circuits 90 corresponding to the piezoelectric element pairs 8 to be driven, and the drive circuits 90 may start to supply the drive signal S2 to the four connected piezoelectric elements 7 at the same timing (simultaneously). In addition, in the case where the vibration is weak so that the click feeling cannot be provided when the drive signal S2 supplied simultaneously to the two piezoelectric element pairs 8, the display control portion 10 may shift the timing to give the instruction signal S1. In other words, input start timing of the drive signal S2 by the drive circuit 90 may be shifted for each piezoelectric element pair 8.

Further, the display control portion 10 switches the display on the display portion 5 as necessary (Step #5). For instance, the display control portion 10 controls the display portion 5 to perform switching of the setting screen and switching of key display color in accordance with a key or the like selected by touching. Then, this flow is finished. This flow is performed every time when the touch panel portion 6 is touched.

In this way, the display input device (operation panel 1) according to this embodiment includes the display portion 5 configured to display screens for operation and setting, the touch panel portion 6 disposed on the upper surface of the display portion 5 so as to detect a touched position, the recognition portion (display control portion 10) for recognizing the touched position on the touch panel portion 6 based on the output of the touch panel portion 6, the plurality of piezoelectric elements 7 adjacent to the region of the touch panel portion 6 that is not visually recognized from the outside, and the drive portion 9 configured to supply the piezoelectric elements 7 with the drive signal S2 having the predetermined voltage waveform one or more times so as to vibrate the piezoelectric elements 7 and the touch panel portion 6. Further, the plurality of piezoelectric elements 7 are disposed to be opposed to each other in the short side direction of the touch panel portion 6 and along the long side direction of the touch panel portion 6. Further, the plurality of piezoelectric element pairs 8 are formed, each of which includes the pair of piezoelectric elements 7 opposed to each other in the short side direction of the touch panel portion 6. The drive portion 9 does not simultaneously supply all the piezoelectric element pairs 8 with the drive signal S2.

Thus, it is possible to suppress reduction of the vibration amount (deformation amount) of the touch panel portion 6 due to interference between vibrations generated by the piezoelectric elements 7, because vibration generation start timings or vibration periods of the piezoelectric element pairs 8 are shifted from each other. Therefore, the touch panel portion 6 can be sufficiently vibrated so that the operation feeling (click feeling) like that when a button or a key is pressed can be provided.

In addition, in the case where vibration generation timings of the three or more piezoelectric element pairs 8 arranged in the longitudinal direction of the display portion 5 are set to be the same, the touch panel portion 6 may not be sufficiently vibrated (deformation amount may become small) in a region sandwiched between piezoelectric element pairs 8 on both ends in the longitudinal direction of the display portion 5. Therefore, when three or more piezoelectric element pairs 8 are disposed and the touch panel portion 6 is touched, the drive portion 9 supplies the drive signal S2 to the two piezoelectric element pairs 8 that are first and second closest to the touch position recognized by the recognition portion (display control portion 10). Thus, it is possible to suppress the reduction of the vibration amount (deformation amount) of the touch panel portion 6 due to the interference by inhibiting the piezoelectric element pair 8 away from the touch position from being driven. Therefore, it is possible to sufficiently vibrate (deform) the touch panel portion 6 so that the click feeling can be provided. In addition, because a part of piezoelectric element pairs 8 are not driven, power consumption can be reduced compared with the case where all the piezoelectric element pairs 8 are driven like the conventional structure.

In addition, the display input device (operation panel 1) includes the storage portion (memory 14) for storing the set data determining the piezoelectric element pairs 8 to be supplied with the drive signal S2 in accordance with the recognized touch position, and the drive portion 9 supplies the drive signal S2 to the piezoelectric element pairs 8 determined to supply the drive signal S2 in the set data in accordance with the recognized touch position. Thus, instead of determining the piezoelectric element pairs 8 to be supplied with the drive signal S2 by calculation from the touch position, it is possible to determine the piezoelectric element pairs 8 to be supplied with the drive signal S2 only by referring the set data. Therefore, it is possible to determine the piezoelectric element pair 8 to be supplied with the drive signal S2 easily and quickly.

In addition, the recognition portion (display control portion 10) recognizes the period in which the touch is continued based on the output of the touch panel portion 6. Further, as the touch period is longer, the drive portion 9 increases the number of times of the drive signal S2 supplied to the piezoelectric element pair 8 or increase the amplitude of the voltage as the drive signal S2. Thus, it is possible to set a difference of operation feeling (click feeling) in accordance with the touch period.

In addition, when the recognition portion 8 (display control portion 10) recognizes a touch of the touch panel portion 6 as an input for selecting a displayed key, the drive portion 9 vibrates the piezoelectric elements 7 (piezoelectric element pairs 8) and the touch panel portion 6. Thus, when the display key is operated, the touch panel portion 5 is instantaneously vibrated so as to provide the user with the click feeling accompanying the operation.

The display portion 5 is disposed on the back side of the touch panel portion 6 with a predetermined space to the touch panel portion 6, and the piezoelectric elements 7 (piezoelectric element pairs 8) are attached to the lower side surface of the touch panel portion 6 (between the display portion 5 and the touch panel portion 6). With this layout, it is possible to effectively vibrate the touch panel portion 6.

In addition, the image forming apparatus (multifunction peripheral 100) according to the embodiment includes the above-mentioned display input device (operation panel 1). Therefore, it is possible to sufficiently inform a user having visual or hearing impairment about that an input by touching the touch panel portion 6 is accepted. Therefore, it is possible to provide the image forming apparatus that is easy to use.

(Variation)

Figure 9:
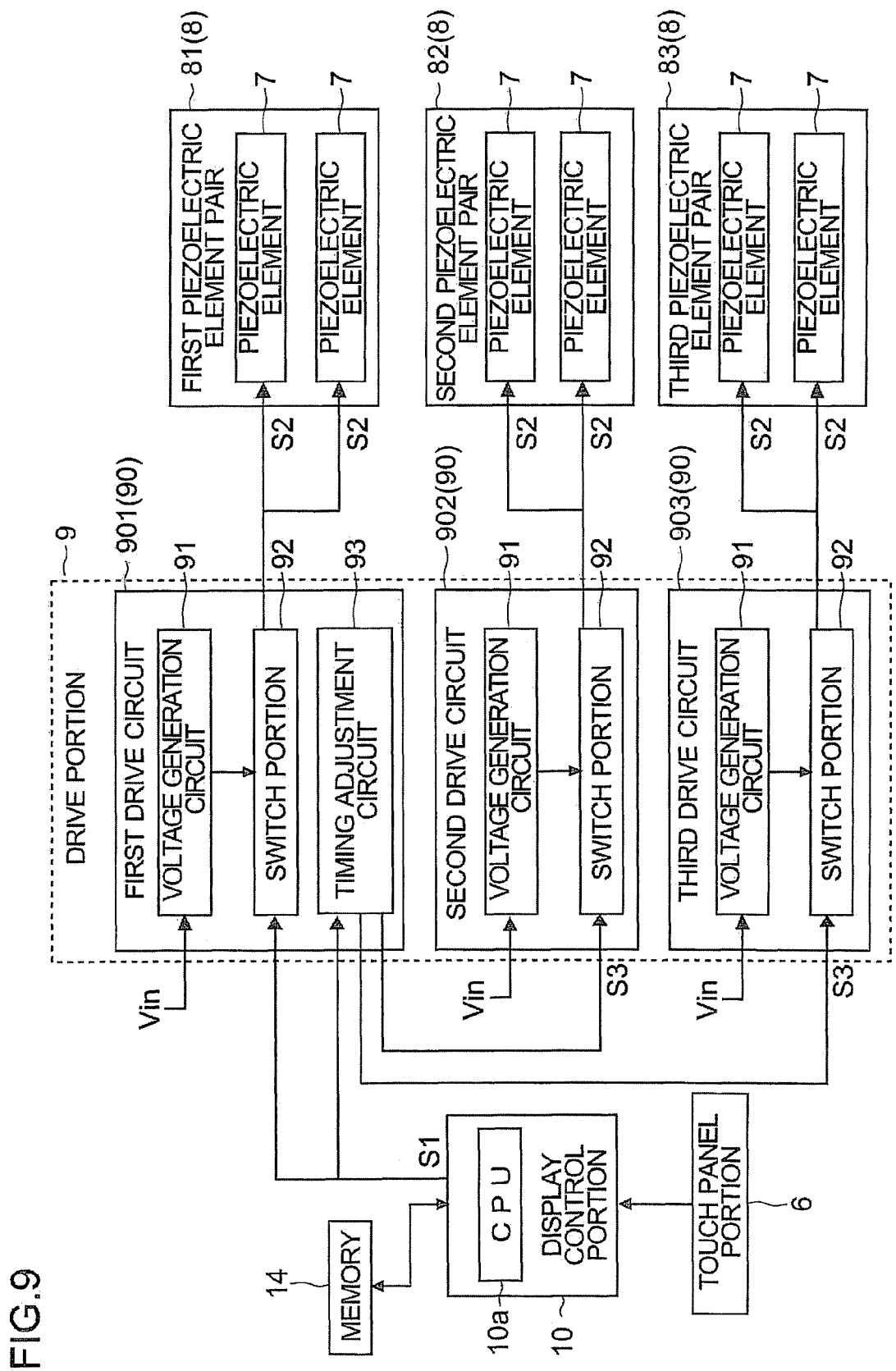
FIG. 9 is a block diagram illustrating an example of a structure for vibrating the touch panel portion in the operation panel according to a variation.
Figure 10:
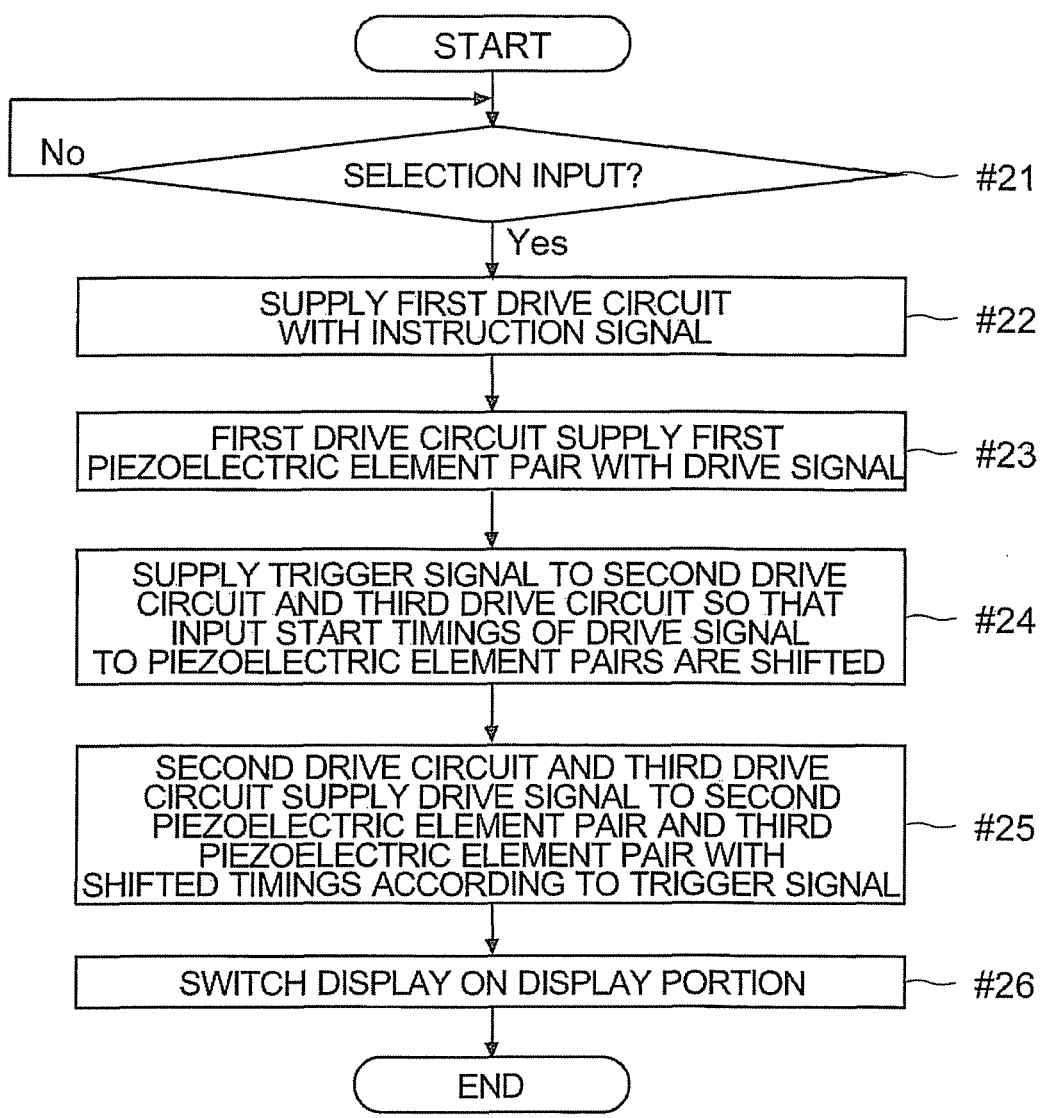
FIG. 10 is a flowchart illustrating an example of a vibration control flow of the touch panel portion in the operation panel according to the variation.

Next, with reference to FIGS. 9 and 10, a variation is described. FIG. 9 is a block diagram illustrating an example of a structure for vibrating the touch panel portion 6 of the operation panel 1 according to the variation. FIG. 10 is a flowchart illustrating an example of the vibration control flow of the touch panel portion 6 of the operation panel 1 according to the variation.

In the embodiment described above, the drive portion 9 supplies the drive signal S2 only to the two piezoelectric element pairs 8 close to the touch position recognized by the display control portion 10. The variation is different from the embodiment in that when the touch panel portion 6 is touched, all the piezoelectric element pairs 8 are supplied with the drive signal S2 and are driven (vibrated). Specifically, the drive portion 9 shifts the input start timing of the drive signal S2 for each piezoelectric element pair 8 so that a shift between the input start timing of the drive signal S2 to the first piezoelectric element pair 8 and the input start timing of the drive signal S2 to the last piezoelectric element pair 8 is within a predetermined time.

Other than noted in the following description, the structure is the same as the embodiment described above. Therefore, description and illustration of the same part are omitted by referring to the description and the illustration of the embodiment described above.

As illustrated in FIG. 9, when the touch panel portion 6 is touched (when an input key or the like is selected), in order to shift the input start timing of the drive signal S2 for each piezoelectric element pair 8, a timing adjustment circuit 93 is disposed in the first drive circuit 901 (corresponding to a main drive circuit) in this embodiment.

This embodiment describes an example in which when the touch panel portion 6 is touched, the drive signal S2 is supplied to the piezoelectric element pairs 8 in order of the first piezoelectric element pair 81, the second piezoelectric element pair 82, and the third piezoelectric element pair 83, but the order is not limited to this example. The timing adjustment circuit 93 may be disposed in one of the drive circuits 90 or in the drive circuit 90 that first supplies the drive signal S2 to the piezoelectric element pair 8.

First, in this embodiment, when the touch panel portion 6 is touched, the display control portion 10 gives the switch portion 92 of the first drive circuit 901 the instruction signal S1 instructing to supply the first piezoelectric element pair 81 with the drive signal S2. When receiving the instruction signal S1, the first drive circuit 901 supplies the first piezoelectric element pair 81 (piezoelectric elements 7 included in the first piezoelectric element pair 81) with the drive signal 82. The instruction signal 81 is supplied also to the timing adjustment circuit 93 of the first drive circuit 901.

Then, the timing adjustment circuit 93 is connected to the switch portions 92 of the second drive circuit 902 (corresponding to an auxiliary drive circuit) and the third drive circuit 903 (corresponding to the auxiliary drive circuit). The timing adjustment circuit 93 supplies the switch portions 92 of the second drive circuit 902 and the third drive circuit 903 with a trigger signal S3 for supplying the drive signal 82 to the piezoelectric element 7. When receiving this trigger signal S3, the second drive circuit 902 (the switch portion 92) and the third drive circuit 903 (the switch portion 92) supplies the connected piezoelectric element pair 8 (the second piezoelectric element pair 82 or the third piezoelectric element pair 83) with the drive signal 82.

Specifically, the timing adjustment circuit 93 outputs the trigger signal S3 so that the input start timings of the drive signal S2 to the piezoelectric element pair 8 (the first piezoelectric element pair 81, the second piezoelectric element pair 82, and the third piezoelectric element pair 83) are shifted for each piezoelectric element pair 8 (so that a phase difference is generated).

In this case, the timing adjustment circuit 93 outputs the trigger signal S3 so that a shift between the input start timing of the drive signal S2 to the first piezoelectric element pair 8 (the first piezoelectric element pair 81 in this embodiment) and the input start timing of the drive signal S2 to the last piezoelectric element pair 8 (the third piezoelectric element pair 83 in this embodiment) is within a predetermined time. It is because that there is a case where the touch panel portion 6 cannot be vibrated (deformed) so as to provide the operation feeling (click feeling) like that when a button or a key is pressed (a deformation speed of the touch panel portion 6 becomes mild) when the shift is too large.

The "predetermined time" can be arbitrarily determined. However, it is preferred to determine a shift time range that can provide the operation feeling (click feeling) like that when a button or a key is pressed by experiment or the like in advance, and to determine the "predetermined time" within the determined time range.

Next, with reference to FIG. 10, there is described an example of the vibration control flow of the touch panel portion 6 of the operation panel 1 according to the variation.

First, similarly to the case of FIG. 8, the flow of FIG. 10 also starts not in a state where the operation of the touch panel portion 6 is stopped in a power save mode or the like but in a state where the operation panel 1 waits for the user to input.

Then, the display control portion 10 checks whether or not the display position in the input region such as a key or a button for setting input is touched, based on the output of the touch panel portion 6 (Step #21).

When there is no selection input of a key or the like (No in Step #21), the flow returns to Step #21. On the other hand, when there is a selection input of a key or the like (Yes in Step #21), the display control portion 10 supplies the first drive circuit 901 with the instruction signal S1 instructing to supply the drive signal S2 to the first piezoelectric element pair 81 connected to the first drive circuit 901 (Step #22). The first drive circuit 901 supplies the first piezoelectric element pair 81 with the drive signal S2 in accordance with the instruction signal S1 (Step #23).

Then, the timing adjustment circuit 93 (first drive circuit 901) supplies the trigger signal S3 to the second drive circuit 902 and the third drive circuit 903 in a predetermined order so that the input start timings of the drive signal S2 to the piezoelectric element pairs 8 are shifted (Step #24).

Further, in accordance with the trigger signal S3, the second drive circuit 902 and the third drive circuit 903 supply the drive signal S2 to the second piezoelectric element pair 82 and the third piezoelectric element pair 83 at shifted timings (Step #25). Then, the display control portion 10 switches the display on the display portion 5 as necessary (Step #26). Then, this flow is finished. This flow is performed every time when the touch panel portion 6 is touched.

In this way, in the display input device (operation panel 1) according to this embodiment, when the touch panel portion 6 is touched, the drive portion 9 supplies the drive signal S2 to the piezoelectric elements 7 by shifting the input start timing of the drive signal S2 for each piezoelectric element pair 8, so that a shift between the input start timing of the drive signal S2 to the first piezoelectric element pair 8 and the input start timing of the drive signal S2 to the last piezoelectric element pair 8 is within a predetermined time. Thus, the vibration generation timings or the vibration periods from the piezoelectric element pairs 8 are shifted, and hence reduction of the vibration amount (deformation amount) of the touch panel portion 6 due to interference can be suppressed. Therefore, it is possible to sufficiently vibrate (deform) the touch panel portion 6 so that the click feeling can be provided.

In addition, the drive portion 9 is disposed for each of the piezoelectric element pairs 8, is connected to the piezoelectric element 7 of the piezoelectric element pair 8, and includes the drive circuits 90 (the first drive circuit 901, the second drive circuit 902, and the third drive circuit 903) for supplying the drive signal S2 to the piezoelectric elements 7. Among the plurality of drive circuits 90, one drive circuit 90 as the main drive circuit (first drive circuit 901) is connected to the auxiliary drive circuits (the second drive circuit 902 and the third drive circuit 903) that are the drive circuits 90 other than the main drive circuit (first drive circuit 901). The main drive circuit supplies the connected piezoelectric elements 7 with the drive signal S2, and gives the auxiliary drive circuits with the trigger signal S3 for supplying the drive signal S2 to the piezoelectric elements 7 so that the vibration start timings of the piezoelectric element pairs 8 are shifted. When receiving the trigger signal S3, the auxiliary drive circuit supplies the connected piezoelectric elements 7 with the drive signal S2. Thus, using the drive circuit 90 (first drive circuit 901) as a master, it is possible to shift the input start timings of the drive signal S2 to the piezoelectric element pairs 8 by the other drive circuits 90 (the second drive circuit 902 and the third drive circuit 903). Therefore, only by shifting the timing of the trigger signal S3 from the drive circuit 90 as one master, it is possible to control the input start timing of the drive signal S2 to the piezoelectric element pairs 8 so as to suppress the reduction of the vibration amount (deformation amount) of the touch panel portion 6 due to interference.

The present disclosure can be supplied to a method.

Although the embodiment of the present disclosure is described above, the scope of the present disclosure is not limited to this. It is possible to add various modifications for embodiments without deviating from the spirit of the disclosure.

What is claimed is:

1. A display input device comprising:
   a display panel configured to display screens for operation and setting;
   a touch panel disposed on a top surface of the display panel so as to detect a touched position;
   a display controller configured to recognize the touched position on the touch panel based on an output of the touch panel;
   a plurality of piezoelectric elements disposed adjacent to a region that is not visually recognized from outside in the touch panel, along a long side direction of the touch panel so as to be opposed to each other in a short side direction of the touch panel, forming a plurality of piezoelectric elements pairs, each of which includes a pair of piezoelectric elements opposed to each other in the short side direction of the touch panel;
   a main drive circuit that is a dedicated main drive circuit out of a plurality of drive circuits which are provided one for each of the piezoelectric element pairs, the main drive circuit being configured to feed a drive signal having a predetermined voltage waveform to vibrate piezoelectric elements of the piezoelectric element pair connected thereto and the touch panel; and
   auxiliary drive circuits, as drive circuits other than the main drive circuit out of the plurality of drive circuits which are provided one for each of the piezoelectric element pairs, the auxiliary drive circuits each being configured to feed the drive signal to vibrate piezoelectric elements of the piezoelectric element pair connected thereto and the touch panel, wherein:
   the main drive circuit includes a timing adjustment circuit configured to output a trigger signal prompting the drive signal to be fed to the piezoelectric elements,
   the auxiliary drive circuits each include a switch connected to the timing adjustment circuit, the switch being configured to feed the drive signal to the piezoelectric elements connected thereto on receiving the trigger signal, and
   when the touch panel is touched,
      the main drive circuit
         feeds the drive signal to the piezoelectric elements connected thereto, and
         feeds the trigger signal to each of the auxiliary drive circuits such that vibration start timings of the piezoelectric element pairs are shifted, and a shift between an input start timing of the drive signal to a first one of the piezoelectric element pairs and an input start timing of the drive signal to a last one of the piezoelectric element pairs is within a predetermined time, and
      the auxiliary drive circuits each feed the drive signal to the piezoelectric elements connected thereto on receiving the trigger signal.

2. The display input device according to claim 1, wherein the display controller recognizes a touch period based on an output of the touch panel, and
   the main drive circuit and auxiliary drive circuits increase the number of times of the drive signal to be supplied to the piezoelectric element pair or increase an amplitude of a voltage as the drive signal as the touch period is longer.

3. The display input device according to claim 1, wherein when the display controller recognizes that the touch panel is touched as an input for selecting a displayed key, the main drive circuit and auxiliary drive circuits vibrates the piezoelectric elements and the touch panel.

4. The display input device according to claim 1, wherein the display panel is disposed on a back side of the touch panel with a predetermined space to the touch panel, and
   the piezoelectric elements are attached to a lower side surface of the touch panel.

5. An image forming apparatus comprising the display input device according to claim 1.

6. The display input device according to claim 1, wherein when the touch panel is touched,
   the display controller feeds an instruction signal to the main drive circuit,
   the main drive circuit feeds the drive signal to the piezoelectric element pair connected thereto, and
   when fed with the instruction signal, the timing adjustment circuit feeds the trigger signal to the switch in each of the auxiliary drive circuits at shifted timings.

7. A method of controlling a display input device, the method comprising the steps of:
   displaying screens for operation and setting on a display panel;
   disposing a touch panel on a top surface of the display panel;
   recognizing a touched position on the touch panel based on an output of the touch panel;
   disposing a plurality of piezoelectric elements adjacent to a region that is not visually recognized from outside in the touch panel;
   disposing the plurality of piezoelectric elements along a long side direction of the touch panel so as to be opposed to each other in a short side direction of the touch panel;

forming a plurality of piezoelectric elements pairs, each of which includes a pair of piezoelectric elements opposed to each other in the short side direction of the touch panel;

making a main drive circuit that is a dedicated main drive circuit out of a plurality of drive circuits circuits which are provided one for each of the piezoelectric element pairs, feed a drive signal having a predetermined voltage waveform to vibrate piezoelectric elements of the piezoelectric element pair connected to the main drive circuit and the touch panel;

making each of auxiliary drive circuits, as drive circuits other than the main drive circuit out of the plurality of drive circuits which are provided one for each of the piezoelectric element pairs, feed the drive signal to vibrate piezoelectric elements of the piezoelectric element pair connected to the auxiliary drive circuit and the touch panel;

providing in the main drive circuit a timing adjustment circuit configured to output a trigger signal prompting the drive signal to be fed to the piezoelectric elements;

providing in each of the auxiliary drive circuits a switch connected to the timing adjustment circuit and configured to feed the drive signal to the piezoelectric elements connected to the switch on receiving the trigger signal, and when the touch panel is touched,
making the main drive circuit
feed the drive signal to the piezoelectric elements connected thereto and
feed the trigger signal to each of the auxiliary drive circuits such that vibration start timings of the piezoelectric element pairs are shifted, and that a shift between an input start timing of the drive signal to a first one of the piezoelectric element pairs and an input start timing of the drive signal to a last one of the piezoelectric element pairs is within a predetermined time, and
making each of the auxiliary drive circuits feed the drive signal to the piezoelectric elements connected thereto on receiving the trigger signal.

8. The method of controlling the display input device according to claim 7, further comprising:

recognizing a touch period; and increasing the number of times of the drive signal to be supplied to the piezoelectric element pair or an amplitude of a voltage as the drive signal as the touch period is longer.

9. The method of controlling the display input device according to claim 7, further comprising vibrating the piezoelectric elements and the touch panel when recognizing that the touch panel is touched as an input for selecting a displayed key.

10. The method of controlling the display input device according to claim 7, further comprising:

disposing the display panel on a back side of the touch panel with a predetermined space to the touch panel; and attaching the piezoelectric elements to a lower side surface of the touch panel.

11. The method of controlling the display input device according to claim 7, further comprising:

when the touch panel is touched,
feeding an instruction signal to the main drive circuit,
making the main drive circuit feed the drive signal to the piezoelectric element pair connected thereto, and
making the timing adjustment circuit, when fed with the instruction signal, feed the trigger signal to the switch in each of the auxiliary drive circuits at shifted timings.

* * * * *